US008943588B1

(12) United States Patent
Speegle et al.

(10) Patent No.: US 8,943,588 B1
(45) Date of Patent: Jan. 27, 2015

(54) DETECTING UNAUTHORIZED WEBSITES

(71) Applicant: Amazon Technologies, Inc., Reno, NV (US)

(72) Inventors: Brian L. Speegle, Purcellville, VA (US); Nachiketh Rao Potlapally, Arlington, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/623,720

(22) Filed: Sep. 20, 2012

(51) Int. Cl.
G06F 11/00 (2006.01)
H04L 29/06 (2006.01)

(52) U.S. Cl.
CPC ......... H04L 63/1483 (2013.01); *H04L 63/1441* (2013.01); *H04L 63/1416* (2013.01); *H04L 63/1433* (2013.01)
USPC .......................................................... 726/22

(58) Field of Classification Search
CPC ............ H04L 63/1433; H04L 63/1441; H04L 63/1416; H04L 63/1483
USPC ......................................... 726/22, 23, 25, 26
See application file for complete search history.

(56) References Cited

U.S. PATENT DOCUMENTS

| | | | |
|---|---|---|---|
| 7,765,481 B2 * | 7/2010 | Dixon et al. ................... | 715/738 |
| 8,286,239 B1 * | 10/2012 | Sutton ............................. | 726/22 |
| 8,321,791 B2 * | 11/2012 | Dixon et al. ................... | 715/738 |
| 8,374,885 B2 * | 2/2013 | Stibel et al. .................... | 705/1.1 |
| 2008/0109473 A1 * | 5/2008 | Dixon et al. ................... | 707/102 |
| 2008/0114709 A1 * | 5/2008 | Dixon et al. ................... | 706/13 |
| 2012/0174235 A1 | 7/2012 | Hamilton, II et al. | |
| 2012/0254333 A1 * | 10/2012 | Chandramouli et al. ..... | 709/206 |
| 2012/0311705 A1 * | 12/2012 | Dixon et al. .................... | 726/22 |
| 2013/0014020 A1 * | 1/2013 | Dixon et al. ................... | 715/738 |
| 2013/0138428 A1 * | 5/2013 | Chandramouli et al. ........ | 704/9 |
| 2013/0185802 A1 * | 7/2013 | Tibeica et al. .................. | 726/26 |

OTHER PUBLICATIONS

Venkatesh Ramanathan & Dr. Harry Wechsler; "Phishing Detection Using Probabilistic Latent Semantic Analysis", May 2010, Department of Computer Science, George Mason University.*
Venkatesh Ramanathan & Dr. Harry Wechsler; Phishing detection methodology Using Probabilistic Latent Semantic Analysis, AdaBoost and co-training, EURASIP Journal on Information Security, Mar. 2012.*
Google Safe Browsing v2 API: implementation notes Technical information about using Google Safe Browsing v2 Julien Sobrier, Zscaler Jan. 17, 2011 Version 1.1.*
*Safe Browsing API*, https://developers.google.com/safe-browsing/, downloaded Mar. 29, 2013, 2 pages.

* cited by examiner

*Primary Examiner* — Samson Lemma
(74) *Attorney, Agent, or Firm* — Klarquist Sparkman, LLP (57) ABSTRACT

Various embodiments describe a website analyzer that can be used for the automatic identification of unauthorized or malicious websites. A website analyzer can include heuristics for automatically identifying a collection of behaviors typical of unauthorized websites. Some embodiments automatically scan content hosted across server computers in a virtual environment and proactively identify potentially malicious websites. The embodiments can also be used to automatically scan content on public networks, such as the Internet. In particular embodiments, the website analyzer can include a semantic analysis engine and a link analysis engine. The semantic analysis engine can use the tag-level structure of HTML pages to formulate metrics which define similarity of web page content. The link analysis engine can compare the structure of embedded URIs and scripts to define metrics which quantify the difference of links between an authorized site and a potentially malicious site.

18 Claims, 8 Drawing Sheets

DETECTING UNAUTHORIZED WEBSITES

BACKGROUND

Phishing is an attempt to acquire information, such as usernames, passwords, credit card details, etc., by masquerading as a trustworthy entity. Communications purporting to be from popular social web sites, auction sites, online payment processors or IT administrators are commonly used to lure an unsuspecting member of the public to a fake or unauthorized website, which has a look and feel almost identical to an authentic or legitimate website. Phishing is an example of social engineering techniques used to deceive users and exploits weaknesses in web security technologies. Attempts to deal with the growing number of reported phishing incidents include legislation, user training, public awareness, and technical security measures.

DETAILED DESCRIPTION

Various embodiments describe a website analyzer that can be used for the automatic identification of unauthorized or malicious websites. A website analyzer can include heuristics for automatically identifying a collection of behaviors typical of unauthorized websites. Some embodiments automatically scan content hosted across server computers in a virtual environment and proactively identify potentially malicious websites. The embodiments can also be used to automatically scan content on public networks, such as the Internet. A collection of metrics can be used to identify websites that are visually similar, but have dissimilar underlying webpage construction. For example, a website analyzer can use a pre-computed set of reference values formulated for authorized or legitimate websites that are frequent targets (e.g. financial institutions, branded retail sites, etc.) of such attacks.

In particular embodiments, the website analyzer can include a semantic analysis engine and a link analysis engine either separately or as a combined unit. The semantic analysis engine can use the tag-level structure of HTML pages as found in an authorized site's Document Object Model (DOM) to formulate metrics which define similarity of web page content. The link analysis engine can compare the structure of embedded URIs and scripts to define metrics which quantify the difference of links between an authorized site and a potentially malicious site. Based on the above analysis, the website analyzer can generate a confidence score indicative of the likelihood of the tested website being a malicious copy of a site.

Figure 1:
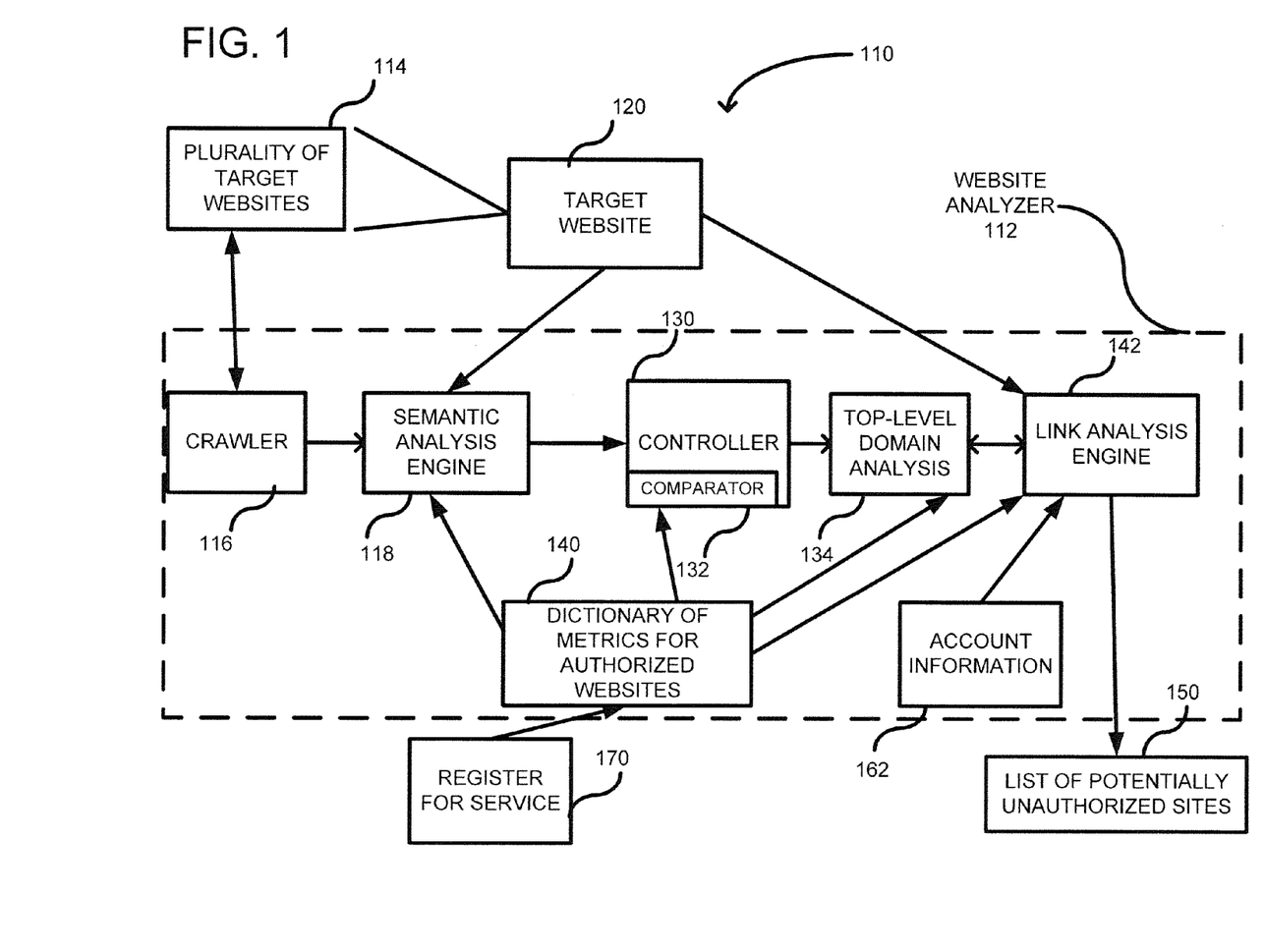
FIG. 1 is an example system diagram showing a website analyzer that can be used for detecting unauthorized sites.

FIG. 1 provides a particular embodiment of a system 110 including a website analyzer 112. In this embodiment, the website analyzer 112 can scan through a plurality of target websites 114 using a web crawler 116 that can methodically and automatically browse through different websites in an orderly fashion. A currently selected target website address can be passed by the crawler 116 to a semantic analysis engine 118. Using the target website address, the semantic analysis engine 118 can browse to or otherwise download a currently selected target website shown at 120. As further described below, the semantic analysis engine 118 can select content from the target website, generate quantitative metrics associated with the selected content and pass the same to a controller 130. The quantitative metrics can include text analysis, picture analysis, webpage composition, such as content location (e.g., picture location), font analysis, color analysis, etc. The controller can be a standard component, such as a program that can be executed by a processor, an Application-specific integrated circuit, a microcontroller, etc. The controller 130 can include a comparator 132 used to compare the quantitative metrics from the semantic analysis engine 118 and a dictionary 140 including metrics for authorized websites. If there is sufficient similarity (i.e., exceeding a threshold level) between the target website and one of the websites in the dictionary 140, then the controller 130 can pass the address of the target website to a top-level domain analysis engine 134. The top-level domain analysis engine 134 can compare a structure of the target website 120 to a structure of the authorized website found in the dictionary of metrics 140. If the structures differ, then the top-level domain analysis engine 134 can determine that the target website is potentially unauthorized. For example, if the authorized website has a home page that is a top-level link and the substantially similar page on the target website 120 is a sub-page, then the target website 120 can be potentially unauthorized. As is well understood in the art, a subpage usually refers to a lower level web page in a website with the same main name as the starting level page plus a slash and text identifying the location of the subpage. More precisely, it refers to a part of the path in the hierarchical part of the Uniform Resource Identifier (also known as URI or URL). For example, if the name of the main page were "first", a typical subpage would be called "first/second". In most implementations subpages can have their own subpages (e.g. :first/second/third). Other structural differences between the potentially unauthorized site and the authorized site can include different encoding schemes, the presence of unexpected characters, etc.

Further analysis can be accomplished using a link analysis engine 142 coupled to the top-level domain analysis engine 134. The link analysis engine 142 can compare one or more links or source addresses from the target website with corresponding links or source addresses in the dictionary 140 of metrics for the authorized site. If a threshold number of links are different, then the link analysis engine can add the address of the target website to a list of potentially unauthorized sites 150 or take other corrective action. As shown at 162, the link analysis engine 142 can further take into consideration account information 162 associated with the target website. Particularly, in environments where the target website is hosted (e.g., by a Web hosting company, an Infrastructure as a Service (IaaS) provider, a Platform as a Service (PaaS) provider, etc.), a target website may be associated with an account. Certain account information can be used to assess the probability that the site is unauthorized, such as a credit card (if any) associated with the account, information indicating whether a credit card number associated with the account has been verified, information indicating how long the account has been active, the difference in the age of content between the authorized site and unauthorized site, the IP address or addresses associated with principles of the account, if the account is associated with a blacklisted entity or sourced from a suspect country. Other account information can also be used, such as who owns the account. For example, if the target website is very similar to a different account holder's site, then the probability that the site is malicious is increased. As shown at 170, the website analyzer 112 can be a service for which users register. By registering, the user can either directly or indirectly have their website added to the dictionary 140. The link analysis engine 142 can also be configured, e.g., via a script, to confirm that the links on the target website are working properly. Often, unauthorized websites have links that are not operable. If a threshold number of links are not working, then the link analysis engine 142 can determine that the target website 120 is not authorized. Although the top-level domain analysis engine 134 and the link analysis engine 142 are shown in series, the functionality described with respect to each engine can be combined into a single engine, run in a distributed manner across multiple computer systems, and/or either one of these engines can be eliminated and the other engine used to generate the final list of potentially unauthorized sites. Thus, one or both of these engines can be used.

Figure 2:
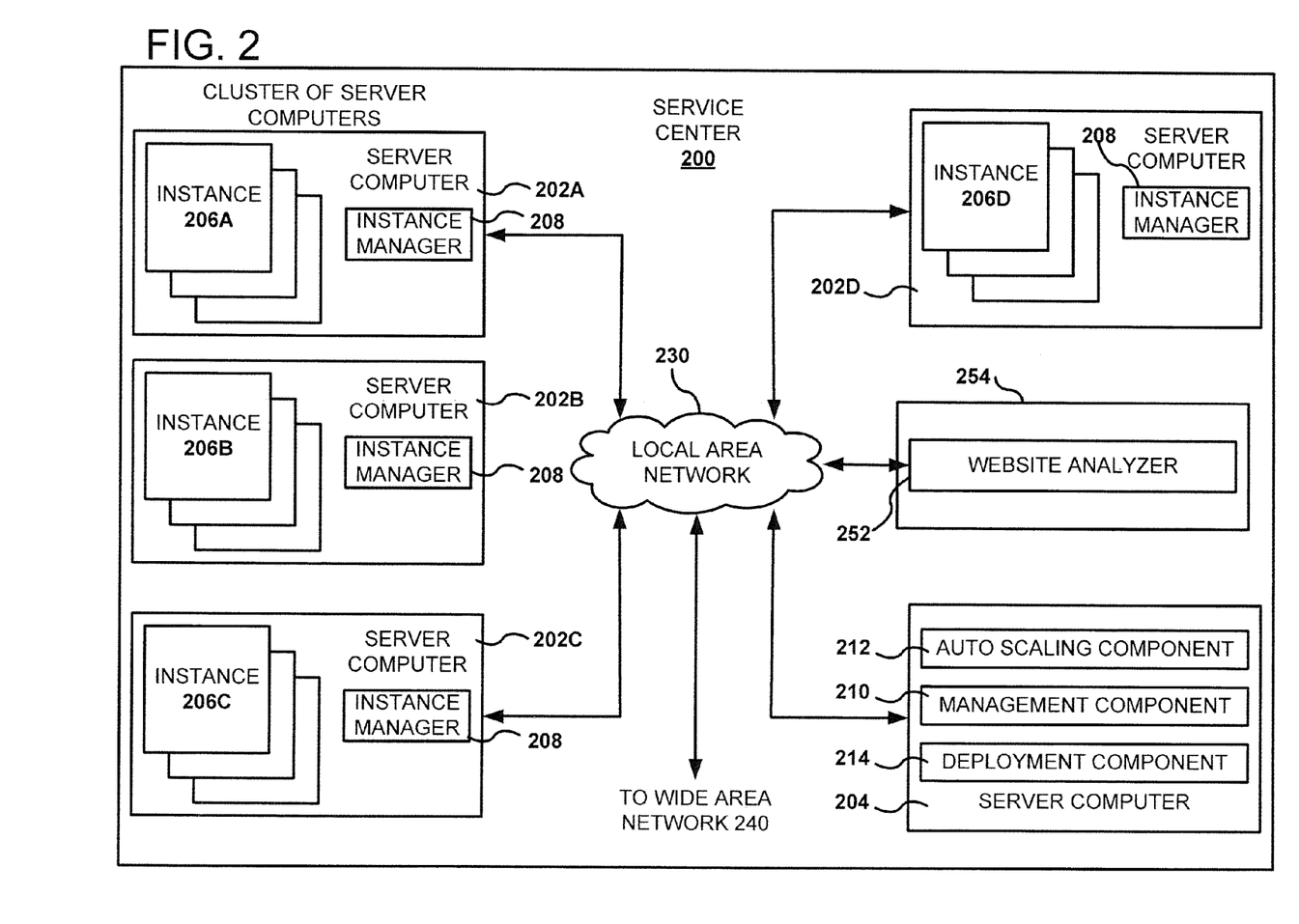
FIG. 2 is an example system diagram showing a plurality of virtual machine instances that can be used in conjunction with the website analyzer.

FIG. 2 is a computing system diagram of a network-based service center 200 that illustrates one environment in which a website analyzer can be used. By way of background, the service center 200 is capable of delivery of computing and storage capacity as a service to a community of end recipients. Generally speaking, the service center 200 can provide the following models: Infrastructure as a Service, Platform as a Service, and/or Software as a Service (SaaS). Other models can be provided. For the IaaS model, the service center 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the service center platform without the cost of buying and managing the underlying hardware and software. The SaaS model allows installation and operation of application software in the service center. In some embodiments, end users access the service center 200 using networked client devices, such as desktop computers, laptops, tablets, smartphones, etc. running web browsers or other lightweight client applications. Those skilled in the art will recognize that the service center 200 can be described as a "cloud" environment.

The particular illustrated service center 200 includes a plurality of server computers 202A-202D. While only four server computers are shown, any number can be used, and large centers can include thousands of server computers. The server computers 202A-202D can provide computing resources for executing software instances 206A-206D. In one embodiment, the instances 206A-206D are virtual machine instances. As known in the art, a virtual machine instance is an instance of a software implementation of a machine (i.e. a computer) that executes applications like a physical machine. In the example of virtual machine instances, each of the servers 202A-202D can be configured to execute an instance manager 208 capable of executing the instances. The instance manager 208 can be a hypervisor or another type of program configured to enable the execution of multiple instances 206 on a single server. Additionally, each of the instances 206 can be configured to execute one or more applications.

It should be appreciated that although the embodiments disclosed herein are described primarily in the context of virtual machine instances, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

A server computer 204 can be reserved for executing software components for managing the operation of the server computers 202 and the instances 206. For example, the server computer 204 can execute a management component 210. A customer can access the management component 210 to configure various aspects of the operation of the instances 206 purchased by the customer. For example, the customer can purchase, rent or lease instances and make changes to the configuration of the instances. The customer can also specify settings regarding how the purchased instances are to be scaled in response to demand. An auto scaling component 212 can scale the instances 206 based upon rules defined by the customer. In one embodiment, the auto scaling component 212 allows a customer to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist customers in the deployment of new instances 206 of computing resources. The deployment component can have access to account information associated with the instances, such as who is the owner of the account, credit card information, country of the owner, etc. The deployment component 214 can receive a configuration from a customer that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the customer-provided configuration and cache logic to configure, prime, and launch new instances 206. The configuration, cache logic, and other information may be specified by a customer using the management component 210 or by providing this information directly to the deployment component 214. Other mechanisms might also be utilized to configure the operation of the deployment component 210.

The service center 200 can also include a website analyzer 252. The website analyzer 252 can be positioned on a separate server 254 or can be executed on server computer 204. In any event, the website analyzer can scan the instances 206 on the various server computers 202 in the service center in an effort to detect unauthorized websites. Once potentially unauthorized websites are detected, automated techniques can be used for taking corrective action, or a list of such websites can be generated for follow-up by personnel of the service center 200. In certain embodiments, the website analyzer 252 can retrieve account information from the deployment component 214 in order to further access the validity of the analyzed websites. Additional features can also be provided.

A network 230 can be utilized to interconnect the server computers 202A-202D and the server computer 204, 252. The network 230 can be a local area network (LAN) and can be connected to a Wide Area Network (WAN) 240 so that end users can access the service center 200. It should be appreciated that the network topology illustrated in FIG. 2 has been simplified and that many more networks and networking devices can be utilized to interconnect the various computing systems disclosed herein.

Figure 3:
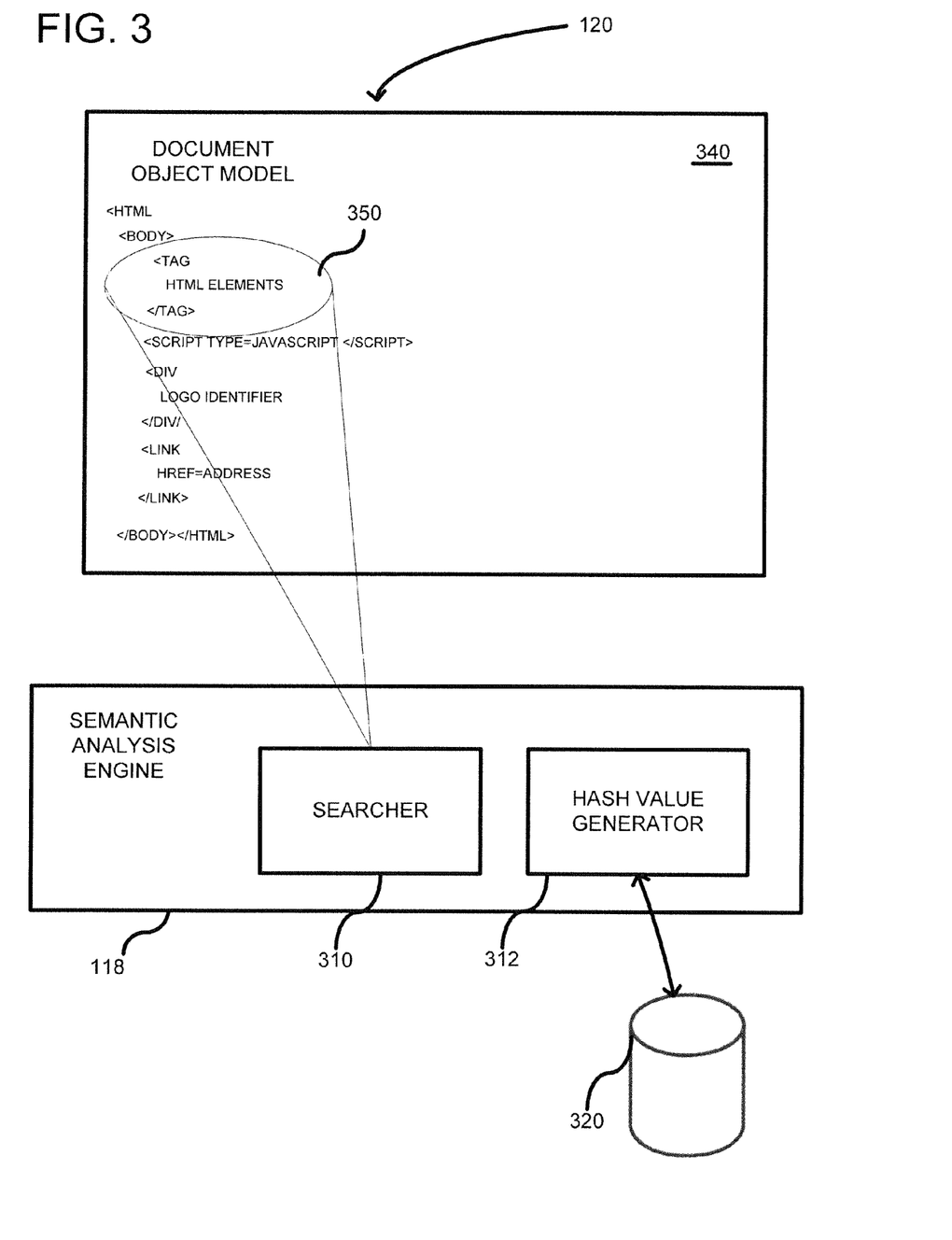
FIG. 3 is an example semantic analysis engine that can be used as part of the website analyzer.

FIG. 3 shows an example embodiment of a semantic analysis engine 118. The semantic analysis engine 118 can include a searcher 310 and a hash value generator 312 for analyzing target websites and/or for generating the dictionary 140 of metrics for authorized websites. As is well understood, the searcher 310 and the hash value generator 312 can be a combined component. The semantic analysis engine 118 can be coupled to a database 320 for storing results of the analysis or for generating the metrics stored in the dictionary. The searcher 310 can search through the target website 120 received from the crawler 116 in order to identify content of the website. The example website 120 being searched is in HTML format and includes a Document Object Model (DOM) 340. Using HTML tags (e.g., div tags, script tags, etc.) in the DOM, the searcher 310 can search for desired content (e.g., text, images, scripts, etc.). Particular content of interest can be logos, login credentials, etc. Generically, the tags and associated HTML elements are shown at 350. In order to extract the desired content, the searcher 310 can search on start and end tags, and detect and copy the HTML elements there between. It will be understood by those skilled in the art that different object models and languages can be used other than DOM and HTML. The webpage composition can also be considered. For example, the location information of the content, as well as style elements can be extracted and analyzed. For example, picture location, fonts, color, etc. can be compared to such elements on the authorized website. The hash value generator 312 can receive the extracted content, such as HTML elements, found by the searcher 310 and generate one or more quantitative metrics, such as a string of hash values, associated with the content. Any desired hash functions can be used by the hash value generator 312. Once the quantitative metrics are generated, they can be stored in the database 320 for use in the dictionary 140 or they can be passed to the controller 130 for further analysis and comparison to the dictionary.

Figure 4:
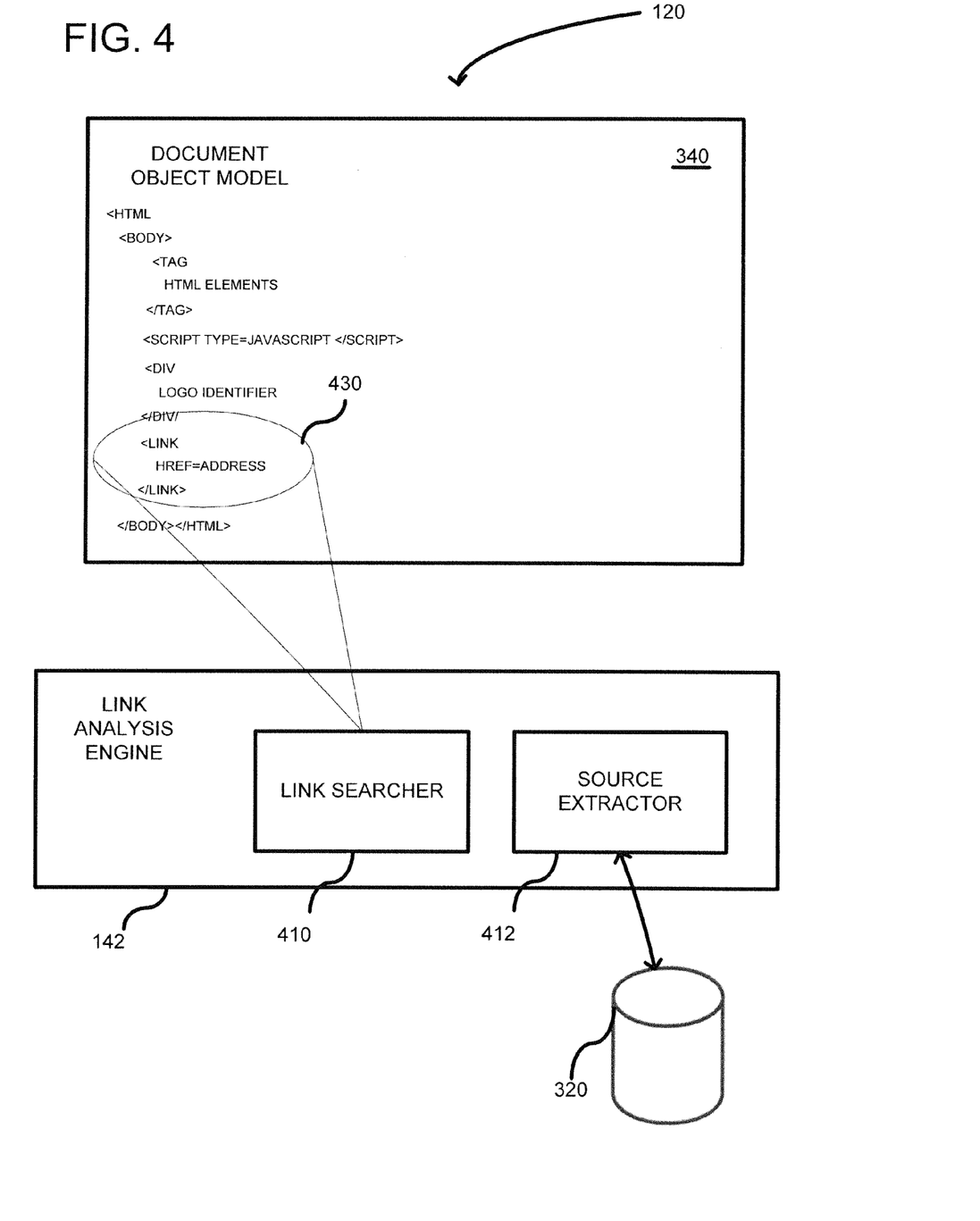
FIG. 4 is an example link analysis engine that can be used as part of the website analyzer.

FIG. 4 shows an example embodiment of a link analysis engine 142. The link searcher 410 need not be used unless the semantic analysis engine 118 determines that a threshold amount of quantitative metrics from the target website 120 match the quantitative metrics of the dictionary 140. The link analysis engine 142 can include a link searcher 410 and a source extractor 412. As is well understood, the link searcher 410 and source extractor 412 can be a combined component. The link searcher 410 can receive the target website using an address passed to it by the controller 130. Alternatively, the link analysis engine can receive the address from the crawler 116 or semantic analysis engine 118. In any event, the link searcher 410 can access the target website 120 and its' associated DOM 340. A search can be performed for predetermined start and end tags associated with links. As shown at 430, in the case of a DOM, the tag can be a "link" tag and a source address can be positioned between the start and end link tags. The link searcher 410 can include a script to verify that the link functions properly. Links that are not working are considered as adding to the possibility that the target website is not authorized. The link searcher 410 can then pass the address to the source extractor 412, which can determine a source server of the link or can simply use the address. In some instances determining a source server can require parsing the address to determine a root, which identifies a name associated with a web server. The address, the source server, or some other combination or derivative, can then be stored in the database 320 or compared to the dictionary 140. If compared to the dictionary 140, the source extractor 412 can receive a key (such as from the semantic analysis engine 118 or the controller 130) used to access the appropriate record in the dictionary and determine if the source or address of the target website is the same as the dictionary version. If the links (source or address) do not match, then the target site 120 is identified as a potentially unauthorized site. Alternatively, not matching can be a weighted factor in an overall evaluation of the site. Other weighted factors can be used, such as account information (e.g., account owner, date of opening account, country of origin, etc.).

Figure 5:
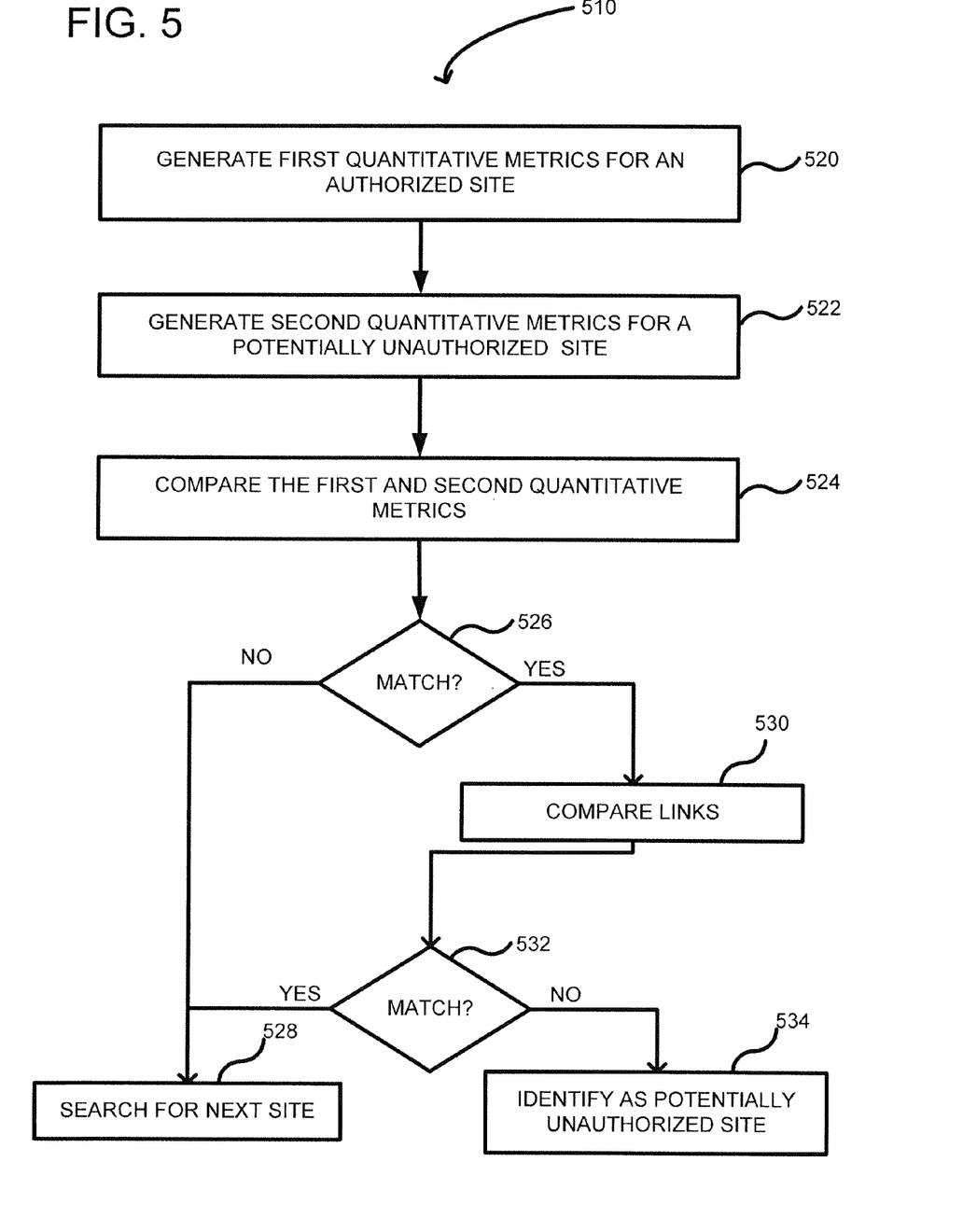
FIG. 5 is a detailed flowchart of a method that can be used to detect unauthorized websites.

FIG. 5 is a flowchart 510 of an embodiment for identifying unauthorized websites. In process block 520, a first quantitative metrics can be generated for an authorized site. As previously described, the first quantitative metrics can be generated by the semantic analysis engine 118 and stored in the dictionary 140. In process block 522, second quantitative metrics can be generated for a potentially unauthorized site. The second quantitative metrics can also be generated by the semantic analysis engine 118, as previously described. The first and second quantitative metrics can be hash value strings associated with content, such as text, images, scripts, etc., of the sites. In process block 524, the first and second quantitative metrics can be compared. In the example where the quantitative metrics are hash values, such values can be directly compared in a well-known manner. For example, the comparator 132 can be used for such a comparison. Other comparison techniques can be used, whether in hardware, software or firmware. In decision block 526, a check is made to determine if there is a match between the first and second quantitative metrics. Matching can be an identical match or whether a predetermined threshold amount is exceeded. For example, if a predetermined (e.g., user entered) percentage of strings of hash values are matched, then the quantitative metrics can be considered matched. If decision block 526 is answered in the negative, then in process block 528, it is determined that the site is not a candidate for a list of unauthorized sites and a next site can be searched for and analyzed. If decision block 526 is answered in the affirmative, then further analysis is needed. In process block 530, a link comparison can be performed between the target website and the corresponding authorized site from the dictionary 140. The link analysis can be a direct comparison of source addresses, hashes associated with those address, or a portion of the source addresses. If a match is not found in decision block 532, then the site is identified as a potentially unauthorized site (process block 534). Such identification can include adding the unauthorized site to a list, sending notification to the owner of the closely related authorized site, or taking other corrective action, such as removing the unauthorized from a server computer. Matching can be similar to decision block 526 in that a threshold amount can be set to qualify as a match. If process block 532 is answered in the affirmative, then the target site is likely authorized and the process can continue by searching for a next site (process block 528).

Figure 6:
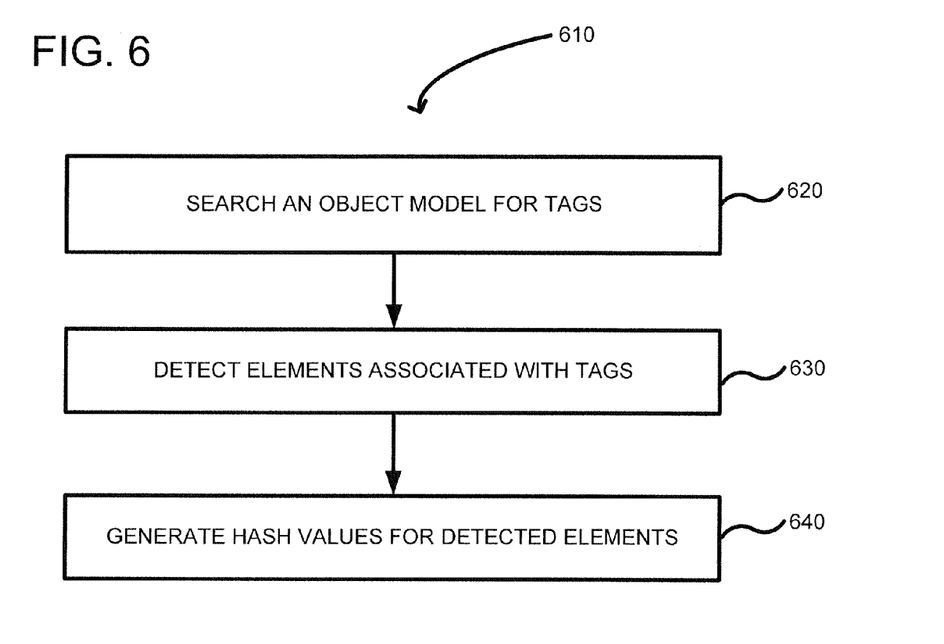
FIG. 6 is a flowchart of a method that can be used to generate quantitative metrics.

FIG. 6 is a flowchart 610 of an embodiment for generating quantitative metrics and can be performed by the semantic analysis engine 118. In process block 620, an object model associated with a website can be searched for tags. For example, a DOM can be searched for predetermined HTML tags. In process block 630, the tags can be detected through a text comparison of known tag names. Detecting the tags can include detecting start and end tags so that content or links between the tags can be extracted. In process block 640, hash values can be generated for the detected elements using any of a variety of available hash functions.

Figure 7:
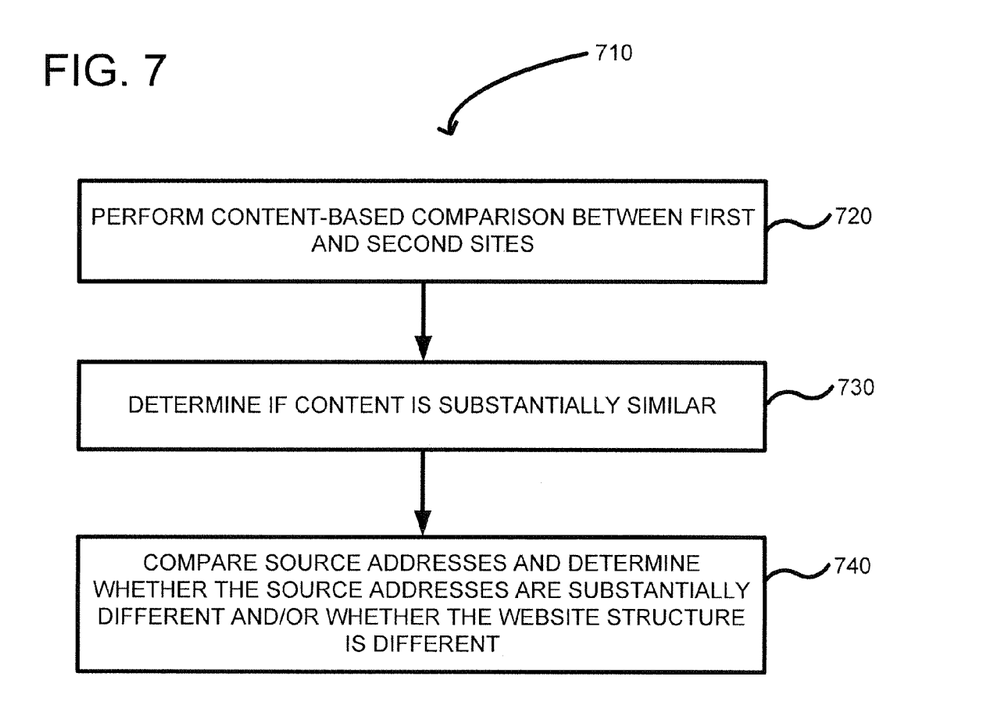
FIG. 7 is a flowchart of another embodiment for detecting unauthorized websites.

FIG. 7 is a flowchart 710 of another embodiment for detecting unauthorized websites. In process block 720, a content-based comparison can be performed between first and second sites. The first site can be a target website of unknown origin, and the second site can be a known, authorized website. The content-based comparison can be for one or more of the following: text, images, or scripts. Other content can also be included. The content-based comparison can be an automated process in which a text comparison, pixel comparison, hash comparison, or other can be performed. In process block 730, an automatic determination is made whether the content is substantially similar. Substantial similarity can be based on identity, a threshold percentage, or some other criteria depending on the particular design. In process block 740, a comparison can be made of source addresses in the first and second sites to determine if they are substantially different and/or whether the website structure is different. For example, in some implementations, even one suspect address can be sufficient to flag the unauthorized site as problematic. In other implementations, a threshold percentage of suspect addresses can be established to determine whether the sites have substantially different source addresses. In addition or alternatively, the website structure between the two sites can be compared for differences. One structural difference can be sufficient to determine the target site is not authorized. For example, if a target website has a sub-page that is the same as an authorized website's home page, then the target website can be considered potentially unauthorized.

Figure 8:
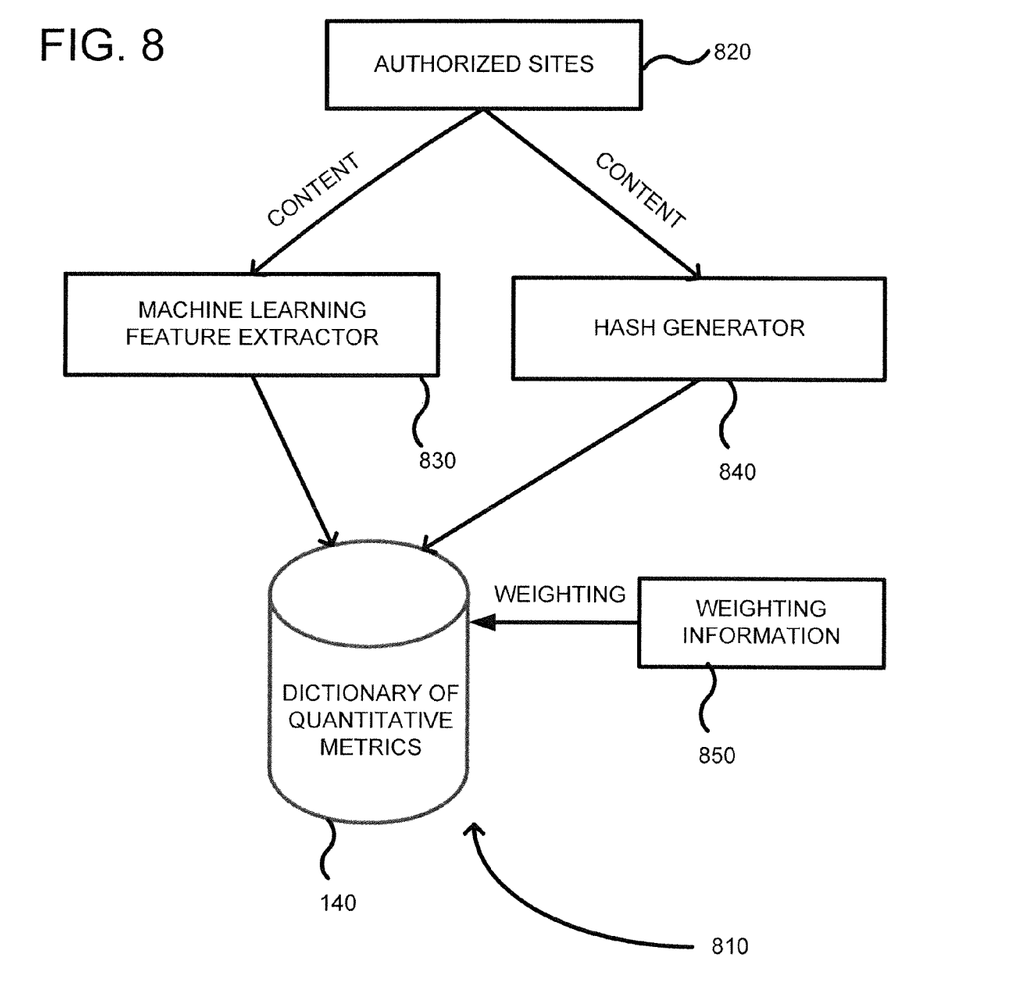
FIG. 8 shows a system diagram that can be used for generating a dictionary of quantitative metrics.

FIG. 8 is an embodiment of a system 810 for generating a dictionary of quantitative metrics. At 820, a plurality of authorized websites can be identified. A variety of techniques can be used for generating quantitative metrics based on content extracted from the authorized sites. For example, a machine learning feature extractor component 830 can be used. A variety of known machine learning algorithms can be used in order to analyze the content and generate the quantitative metrics. A similar machine learning feature extractor can be used in the semantic analysis engine 118 of FIG. 1. Alternatively, or in combination, a hash generator 840 can be used for generating the quantitative metrics from the content. The generated quantitative metrics can be stored in the dictionary 140 for later comparison against other sites. Weighting information 850 can also be used to indicate the importance of certain content. For example, logos and login credential scripts can be more heavily weighted. The weighting information can be programmed or based on user input.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer. As should be readily understood, the term computer-readable storage media does not include communication connections, such as modulated data signals.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an Intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of detecting an unauthorized site in a service center including a plurality of server computers, comprising:

generating first quantitative metrics for an authorized site, wherein the first quantitative metrics are generated from at least content on the authorized site;

generating second quantitative metrics for a potentially unauthorized site, wherein the second quantitative metrics are generated from at least content on the unauthorized site;

comparing, using a computer, the first and second quantitative metrics so as to perform, at least in part, a content-based comparison between the unauthorized site to the authorized site;

if a threshold amount of the first quantitative metrics matches the second quantitative metrics, then performing a link analysis by comparing one or more links on the authorized site and the potentially unauthorized site, and further including comparing proprietary account information associated with a customer of the service center, the customer being associated with the unauthorized site;

if the links do not match, then identifying the potentially unauthorized site as not associated with the authorized site.

2. The method of claim 1, wherein generating the first quantitative metrics includes searching an object model of the authorized site for tags, detecting content elements associated with the tags, and generating first hash values of the detected content elements.

3. The method of claim 2, wherein the object model is a Document Object Model and the tags are HTML tags.

4. The method of claim 2, wherein generating the second quantitative metrics includes searching an object model of the potentially unauthorized site for tags, detecting content elements associated with the tags, and generating second hash values of the detected content elements.

5. The method of claim 4, wherein comparing the first and second quantitative metrics includes comparing the first and second hash values.

6. One or more computer-readable storage devices having instructions thereon for executing a method of detecting an unauthorized website in a service center, the method comprising:

performing a content-based comparison between a first website and a second website, wherein the content-based comparison includes at least a logo pixel data comparison, wherein the second website is identified as similar to the first website;

based on the comparison, automatically determining that the first website has substantially similar content to the second website;

comparing source addresses and/or website structure between the first website and the second website and determining that the second website is potentially unauthorized if the content between the first and second websites are substantially similar but at least one of the source addresses is substantially different and/or the website structure is different and/or the logo pixel data is different; and comparing proprietary account information associated with a first customer of the unauthorized site and a second customer of the authorized site, wherein both the first and second customers are associated with the service center.

7. The computer-readable storage media of claim 6, wherein performing the content-based comparison further comprises:

searching for start and end tags in the first website;
generating first hash values for content between the start and end tags;
searching for start and end tags in the second website;
generating second hash values for content between the start and end tags in the second website; and
comparing the first and second hash values.

8. The computer-readable storage media of claim 6, further including generating a dictionary of quantitative metrics for authorized websites by calculating a string of hash values for the authorized websites, wherein the first website is included in the dictionary.

9. The computer-readable storage media of claim 6, further including generating a dictionary of quantitative metrics using machine learning algorithms.

10. The computer-readable storage media of claim 6, further including analyzing a Document Object Model for the first website by searching for tags within the Document Object Model and extracting the content for the first website associated with the tags.

11. The computer-readable storage media of claim 6, wherein performing the content-based comparison further comprises:

generating first quantitative metrics for the first website;
generating second quantitative metrics for the second website;
comparing the first and second quantitative metrics.

12. The computer-readable storage media of claim 11, wherein determining that the first website has substantially similar content to the second website further comprises measuring whether a threshold amount of the first quantitative metrics match the second quantitative metrics.

13. The computer-readable storage media of claim 6, wherein comparing the source addresses between the first website and the second website further includes comparing at least a base part of the source addresses and determining whether the base parts of the source addresses for the second website are not associated with an owner of the first website.

14. The computer-readable storage media of claim 6, wherein performing a content-based comparison between a first website and a second website includes weighting content associated with sensitive information more heavily than other content.

15. The computer-readable storage media of claim 14, wherein the content with sensitive information includes login information associated with receiving a user identification and password.

16. The computer-readable storage media of claim 6, further including generating a plurality of reference values associated with authorized websites including the first website and scanning a plurality of server computers in a virtual environment for the second website to cleanse the virtual environment of unauthorized websites.

17. The computer-readable storage media of claim 6, further including receiving user input on weightings of which content is more important than other content.

18. The computer-readable storage media of claim 6, wherein the content-based comparison includes page composition and style elements.

* * * * *